J. BROWN.
Coffee-Roaster.
No. 131,597.                                                                 Patented Sep. 24, 1872.
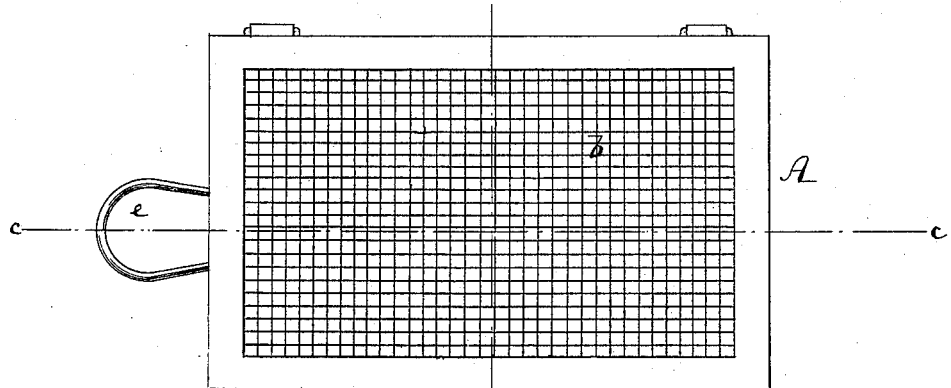
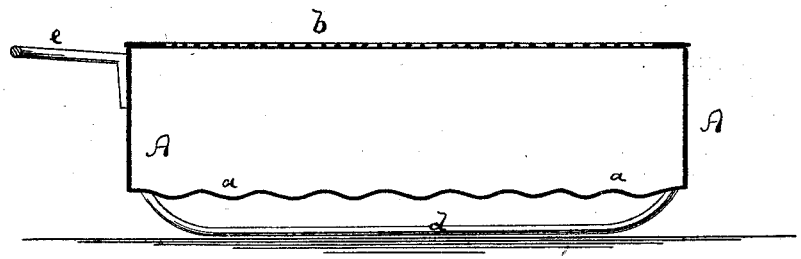
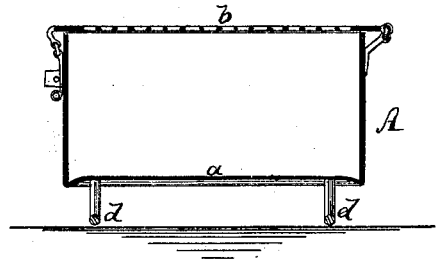
Witnesses:
A. W. Almquist
C. Sedgwick
Inventor:
J. Brown
per Munn & Co
Attorneys.

UNITED STATES PATENT OFFICE.

JOB BROWN, OF SOUTHAMPTON, ILLINOIS.

IMPROVEMENT IN COFFEE-ROASTERS.

Specification forming part of Letters Patent No. 131,597, dated September 24, 1872.

*To all whom it may concern:*

Be it known that I, JOB BROWN, of Southampton, in the county of Peoria and State of Illinois, have invented a new and Improved Roaster for Coffee, Corn, &c., of which the following is a specification:

Figure 1 is a top view of my improved roaster. Fig. 2 is a vertical longitudinal section of the same on the line $c\,c$, Fig. 1. Fig. 3 is a vertical transverse section of the same on the line $k\,k$, Fig. 1.

Similar letters of reference indicate corresponding parts.

This invention relates to a new coffee-roaster or corn-popper that is provided with a corrugated bottom and supported on rockers, and intended for use in the oven of a stove or range, in which it can be moved back and forth and rocked to turn the grains of coffee and corn when necessary.

In the accompanying drawing, the letter A represents a box, made of sheet-metal, with a corrugated bottom, $a$, and with a perforated hinged lid, $b$. This box is supported on two wire or sheet-metal rockers, $d\,d$, and has at one end a handle, $e$.

The coffee, corn, or other material to be roasted is placed within the box A and the same then inserted in the oven of a stove or range, and placed on the bottom of the same. The oven is then closed and the roaster with its contents exposed to the heat until it is necessary to turn the coffee or corn. For this purpose the oven is opened and the box A vibrated on its rockers, and, if necessary, moved back and forward, the motion of the grains on the corrugated bottom causing them to be stirred and turned in the necessary manner.

Having thus described my invention, I claim as new and desire to secure by Letters Patent—

The roaster A, provided with the corrugated bottom $a$ and rockers $d$, as set forth.

JOB BROWN.

Witnesses:
WM. MEAD,
H. N. MEAD.